United States Patent
He et al.

(10) Patent No.: US 10,637,635 B2
(45) Date of Patent: Apr. 28, 2020

(54) SCHEDULING TIMING DESIGN FOR A TDD SYSTEM

(71) Applicant: Apple Inc., Cupertino, CA (US)

(72) Inventors: Hong He, Sunnyvale, CA (US); Jong-Kae Fwu, Sunnyvale, CA (US); Rui Huang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/408,724

(22) Filed: May 10, 2019

(65) Prior Publication Data

US 2019/0372744 A1 Dec. 5, 2019

Related U.S. Application Data

(63) Continuation of application No. 15/594,267, filed on May 12, 2017, now Pat. No. 10,374,783, which is a
(Continued)

(51) Int. Cl.
*H04L 5/14* (2006.01)
*H04W 76/28* (2018.01)
(Continued)

(52) U.S. Cl.
CPC .......... *H04L 5/1446* (2013.01); *H04L 1/0033* (2013.01); *H04L 1/1635* (2013.01); *H04L 1/189* (2013.01); *H04L 1/1812* (2013.01); *H04L 1/1825* (2013.01); *H04L 1/1854* (2013.01); *H04L 1/1864* (2013.01); *H04L 1/1877* (2013.01); *H04L 1/1887* (2013.01); *H04L 1/1896* (2013.01); *H04L 5/001* (2013.01); *H04L 5/0053* (2013.01); *H04L 5/0055* (2013.01); *H04L 5/0073* (2013.01); *H04L 5/14* (2013.01); *H04L 5/1438* (2013.01);
(Continued)

(58) Field of Classification Search
CPC ..... H04L 5/14; H04L 1/00; H04L 1/16; H04L 1/18; H04L 12/18; H04L 12/28; H04L 12/841; H04L 12/865; H04L 29/06; H04L 29/08; H04L 5/00; H04N 21/258; H04N 21/414; H04N 21/6405; H04N 21/6408; H04W 24/00; H04W 24/02; H04W 28/02; H04W 4/06; H04W 52/02; H04W 52/24; H04W 72/04; H04W 72/08; H04W 72/12; H04W 74/08; H04W 76/27; H04W 76/28
See application file for complete search history.

(56) References Cited

U.S. PATENT DOCUMENTS

| | | | |
|---|---|---|---|
| 2011/0211503 A1* | 9/2011 | Che ................. | H04L 5/0005 370/280 |
| 2013/0208634 A1* | 8/2013 | Ji ...................... | H04W 72/0406 370/280 |
| 2015/0131475 A1* | 5/2015 | Van Phan ........... | H04W 8/26 370/254 |

* cited by examiner

*Primary Examiner* — Kyaw Z Soe
(74) *Attorney, Agent, or Firm* — Sterne, Kessler, Goldstein & Fox P.L.L.C.

(57) ABSTRACT

Disclosed is a method of transmitting, from an enhanced Node B (eNB), an indication of an uplink/downlink (UL-DL) subframe configuration of a scheduling cell and a scheduled cell in a wireless time-division duplex (TDD) system. Embodiments include identifying the type of the UL-DL subframe configuration of the scheduling cell and determining a UL-DL subframe configuration to use for UL resource allocation of the scheduled cell. Other embodiments include identifying a reference UL-DL subframe configuration to use for UL resource allocation of the scheduled cell.

20 Claims, 9 Drawing Sheets

Related U.S. Application Data continuation of application No. 13/716,978, filed on Dec. 17, 2012, now Pat. No. 9,686,089.

(60) Provisional application No. 61/612,188, filed on Mar. 16, 2012.

(51) Int. Cl.

| | | |
|---|---|---|
| H04W 74/08 | (2009.01) | |
| H04W 72/12 | (2009.01) | |
| H04L 1/18 | (2006.01) | |
| H04L 1/16 | (2006.01) | |
| H04W 72/04 | (2009.01) | |
| H04L 12/865 | (2013.01) | |
| H04W 16/04 | (2009.01) | |
| H04W 24/02 | (2009.01) | |
| H04N 21/414 | (2011.01) | |
| H04N 21/6408 | (2011.01) | |
| H04W 4/06 | (2009.01) | |
| H04L 5/00 | (2006.01) | |
| H04L 12/18 | (2006.01) | |
| H04L 29/06 | (2006.01) | |
| H04N 21/258 | (2011.01) | |
| H04N 21/6405 | (2011.01) | |
| H04W 24/00 | (2009.01) | |
| H04W 28/02 | (2009.01) | |
| H04W 52/02 | (2009.01) | |
| H04W 72/08 | (2009.01) | |
| H04L 1/00 | (2006.01) | |
| H04L 12/28 | (2006.01) | |
| H04W 52/24 | (2009.01) | |
| H04L 29/08 | (2006.01) | |
| H04W 76/27 | (2018.01) | |
| H04L 12/841 | (2013.01) | |
| H04W 52/14 | (2009.01) | |
| H04J 11/00 | (2006.01) | |

(52) U.S. Cl.
CPC .......... *H04L 5/1469* (2013.01); *H04L 12/189* (2013.01); *H04L 12/2854* (2013.01); *H04L 47/283* (2013.01); *H04L 47/6275* (2013.01); *H04L 65/601* (2013.01); *H04L 67/02* (2013.01); *H04L 67/2842* (2013.01); *H04N 21/25841* (2013.01); *H04N 21/41407* (2013.01); *H04N 21/6405* (2013.01); *H04N 21/6408* (2013.01); *H04W 4/06* (2013.01); *H04W 16/04* (2013.01); *H04W 24/00* (2013.01); *H04W 24/02* (2013.01); *H04W 28/0236* (2013.01); *H04W 28/0268* (2013.01); *H04W 28/0278* (2013.01); *H04W 52/02* (2013.01); *H04W 52/0206* (2013.01); *H04W 52/0209* (2013.01); *H04W 52/0235* (2013.01); *H04W 52/243* (2013.01); *H04W 72/04* (2013.01); *H04W 72/042* (2013.01); *H04W 72/0406* (2013.01); *H04W 72/048* (2013.01); *H04W 72/0413* (2013.01); *H04W 72/0426* (2013.01); *H04W 72/082* (2013.01); *H04W 72/1205* (2013.01); *H04W 72/1242* (2013.01); *H04W 72/1273* (2013.01); *H04W 72/1284* (2013.01); *H04W 74/085* (2013.01); *H04W 76/27* (2018.02); *H04W 76/28* (2018.02); *H04J 11/0073* (2013.01); *H04L 1/1819* (2013.01); *H04W 52/0229* (2013.01); *H04W 52/143* (2013.01); *H04W 72/0446* (2013.01); *H04W 72/1268* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/23* (2018.01); *Y02D 70/24* (2018.01)

| Scheduling Cell | Scheduled Cell | Reference Configuration | Uplink Resource Efficiency |
|---|---|---|---|
| 0 | 1 | 6 | 75 |
| | 3 | | 66 |
| | 4 | | 100 |
| | 6 | | |
| | 2 | 1 | |
| | 5 | | |
| 1 | 4 | 1 | 100 |
| | 5 | | |
| | 3 | 6 | |
| | 6 | | |
| 2 | 3 | 3 | 100 |
| | 4 | 4 | |
| | 5 | 1/5 | |
| | 6 | 6 | |
| 3 | 0 | 0 | 100 |
| | 2 | 1/6 | |
| | 1 | 6 | |
| | 6 | | |
| 4 | 0 | 0 | 100 |
| | 6 | 6 | |
| | 1 | 1/6 | |
| | 2 | | |
| 6 | 1 | 1 | 75 |
| | 2 | | 100 |
| | 4 | | |
| | 5 | | |
| | 3 | 6 | |

| Set | Scheduling Cell | Scheduled Cell | Reference Configuration |
|---|---|---|---|
| Set 1 | 1 | 2 | 1 |
| | | 4 | |
| | | 5 | |
| | 2 | 5 | 2 |
| | 3 | 4 | 3 |
| | | 5 | |
| | 4 | 5 | 4 |
| Set 2 | 1 | 6 | 6 |
| | 2 | 6 | 6 |
| | 3 | 0 | 0 |
| | | 6 | 6 |
| | 4 | 0 | 0 |
| | | 1 | 1 |
| | | 6 | 6 |
| Set 3 | 2 | 3 | 3 |
| | | 4 | 4 |
| Set 4 | 0 | 1 | 1 |
| | | 2 | |
| | | 5 | |
| | | 3 | 3 |
| | | 6 | 6 |
| | 6 | 0 | 0 |
| | | 1 | 1 |
| | | 2 | |
| | | 5 | |
| | | 3 | 3 |
| | | 4 | 4 |

SCHEDULING TIMING DESIGN FOR A TDD SYSTEM

CROSS REFERENCE TO RELATED APPLICATIONS

The present application is a continuation of U.S. patent application Ser. No. 15/594,267, filed May 12, 2017, entitled "SCHEDULING TIMING DESIGN FOR A TDD SYSTEM," which is a continuation of U.S. patent application Ser. No. 13/716,978, filed Dec. 17, 2012, entitled "SCHEDULING TIMING DESIGN FOR A TDD SYSTEM," now U.S. Pat. No. 9,686,089, issued Dec. 17, 2012, which claims priority to U.S. Provisional Patent Application No. 61/612,188, filed Mar. 16, 2012, entitled "ADVANCED WIRELESS COMMUNICATION SYSTEMS AND TECHNIQUES," the entire disclosures of which are hereby incorporated by reference.

FIELD

Embodiments of the present invention relate generally to the field of communications, and more particularly, to selection of acknowledgement timing in wireless communication networks.

BACKGROUND INFORMATION

A time division duplex (TDD) system, in wireless communications, may offer flexibility in resource utilization. For example, a TDD system may use different subframe configurations to match uplink and downlink traffic characteristics of a wireless communications cell. The flexibility of using different subframe configurations, may permit the ratio between available uplink (UL) and downlink (DL) resources to range from 3UL:2DL to 1UL:9DL.

Release 10, of $3^{rd}$ Generation Partnership Project's (3GPP) long-term evolution-advanced (LTE-A) communications standard, may limit support of the aggregation of TDD Component Carriers (CCs) to the same uplink/downlink (UL-DL) subframe configurations. While such limitations may have simplified the design and operation within the standard, such limitations may have limited potential for greater data throughput.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Illustrative embodiments of the present disclosure include, but are not limited to, methods, systems, and apparatuses for selection of acknowledgement signal timing in a wireless communication network.

Embodiments include methods of identifying a UL-DL subframe configuration of a scheduling and scheduled cell in a TDD wireless system utilizing cross-carrier scheduling. In some embodiments, a type of the scheduling cell may be identified, for example based on a UL round trip time (RTT) of a HARQ process, and a UL-DL subframe configuration for UL resource allocation may be determined based at least in part on the type of the scheduling cell. In other embodiments, a reference configuration may be used for the UL resource allocation. The reference configuration may be based at least in part on the UL-DL subframe configurations of the scheduling and scheduled cells. In some embodiments the methods may be performed by an eNB, a UE, or through some combination of signaling between the two.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
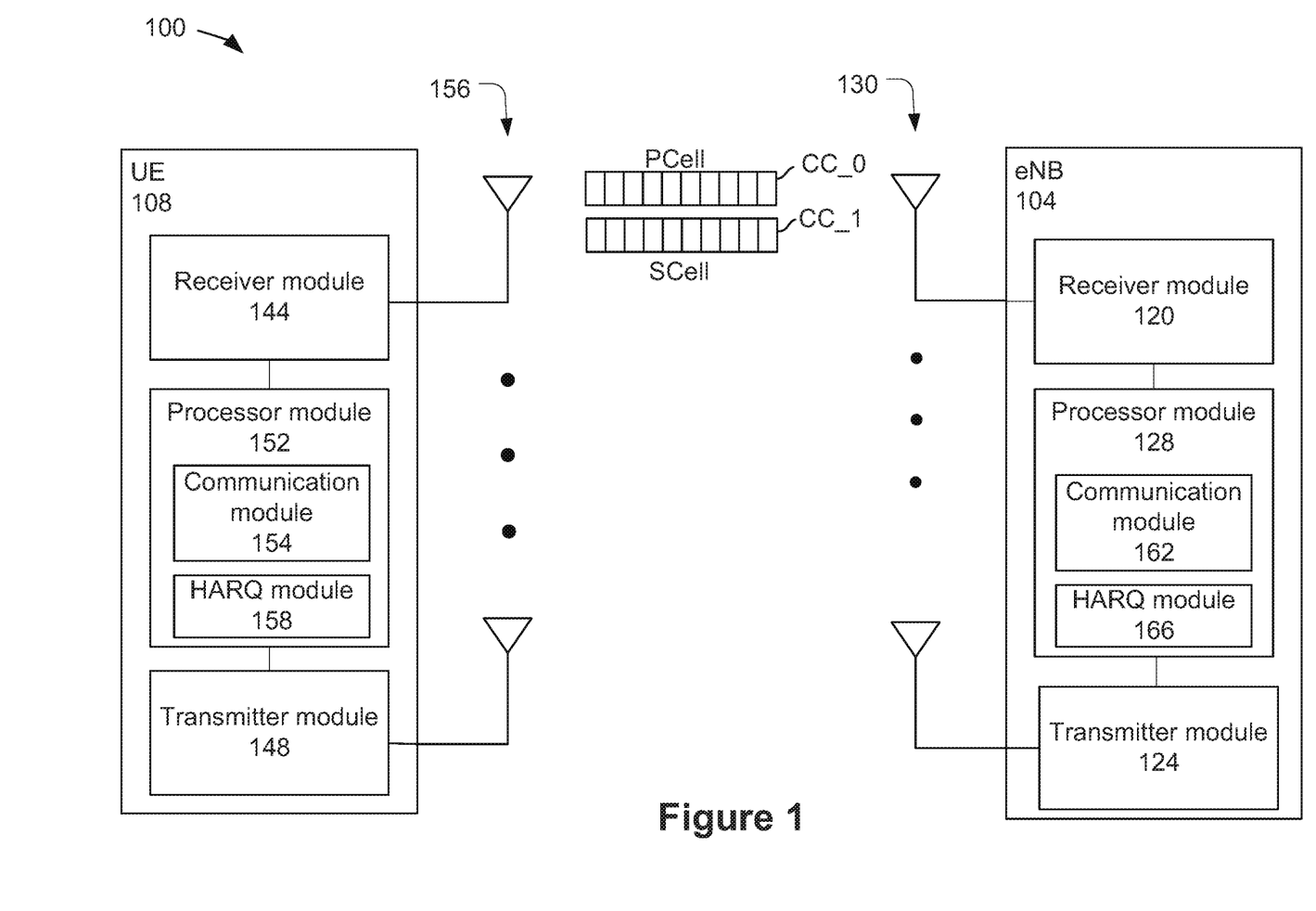
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3GPP long-term evolution (LTE) or LTE-A network such as evolved universal mobile telecommunication system (UMTS) terrestrial radio access network (E-UTRAN). The network 100 may include a base station, e.g., enhanced node base station (eNB) 104, configured to wirelessly communicate with a mobile device or terminal, e.g., user equipment (UE) 108. While embodiments of the present invention are described with reference to an LTE network, some embodiments may be used with other types of wireless access networks.

eNB 104 may include a receiver module 120 with which to receive signals from UE 108 via one or more antennas 130. eNB 104 may include a transmitter module 124 with which to transmit signals to UE 108 via one or more antennas 130. eNB 104 may also include a processor module 128 coupled between receiver module 120 and transmitter module 124 and configured to encode and decode information communicated by the signals.

In embodiments in which the UE 108 is capable of utilizing carrier aggregation (CA), a number of CCs may be aggregated for communication between the eNB 104 and the UE 108. In an initial connection establishment, the UE 108 may connect with a primary serving cell (PCell) of the eNB 104 utilizing a primary CC. This connection may be used for various functions such as security, mobility, configuration, etc. Subsequently, the UE 108 may connect with one or more secondary serving cells (SCells) of the eNB 104 utilizing one or more secondary CCs. These connections may be used to provide additional radio resources. In some embodiments the UE 108 may connect with as many as four SCells.

Each CC may support a number of communication channels according to a release of the 3GPP LTE-A communication standard. For example, each CC may support a physical downlink shared channel (PDSCH) for transmission of downlink data. As another example, each CC may support physical uplink control channel (PUCCH) and/or physical uplink shared channel (PUSCH) to carry information between UE 108 and eNB 104. A CC may include a plurality of uplink and downlink subframes for carrying information between eNB 104 and UE 108. A single 10 ms radio frame may include ten subframes.

The CCs may be configured to transport information according to a TDD communication protocol. Each CC may be scheduled to transport data to UE 108 or transport data to eNB 104 according to one of several UL-DL subframe configurations. In some embodiments the UL-DL subframe configurations may be 3GPP LTE UL-DL subframe configurations 0-6 for UL TDD HARQ processes as defined in table 4.2-2 of 3GPP TS 36.211 v10.5.0 (2012-06) shown in Table 1. In other embodiments, different UL-DL subframe configurations may be used.

With reference to Table 1, each CC may be assigned to transport data and/or control signals according to one of several possible UL-DL subframe configurations. In this embodiment, a primary CC and secondary CC may both be configured with the same UL-DL subframe configuration or with different UL-DL subframe configurations. In general, each of subframes 0-9 that is labeled with a "D" or an "S" is a subframe with which UE 108 receives data from eNB 104, and each of subframes 0-9 that is labeled with a "U" is a subframe through which UE 108 transmits data to eNB 104.

TABLE 1

TDD UL-DL Subframe Configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In some embodiments, the UE 108 may be configured to communicate data to the eNB 104, for example on the PUSCH. In response the eNB 104 may communicate an acknowledgement signal to the UE 108, for example through the physical hybrid adaptive repeat and request indicator channel (PHICH). According one embodiment, the acknowledgement signals may be HARQ signals corresponding to a positive acknowledgement (ACK) of receipt of data and a negative acknowledgement (NACK) of receipt of data. In embodiments, the eNB 104 may be configured to transmit ACK or NACK signals to notify the UE 108 that transmitted data has or has not been received, respectively.

eNB 104 may further be configured to determine a schedule with which to transmit ACK/NACK signals to UE 108. For example, eNB 104 may be configured to determine which UL-DL subframe configurations will be used for the PCell and the SCell, and transmit indications of the UL-DL subframe configurations to the UE 108. In some embodiments, the indications of the UL-DL subframe configurations may be transmitted to the UE 108 in a control signal which may be referred to as a system information block (SIB). In some embodiments the control signal may specifically be the first system information block (SIB1) as described in the 3GPP LTE standards. The SIB1 may be broadcast by the eNB 104, and correspondingly received by the UE 108, on the PDSCH.

UE 108 may include a receiver module 144, a transmitter module 148, a processor module 152, and one or more suitable antennas 156. Receiver module 144 and transmitter module 148 may be coupled to one or more suitable antennas 156 to transmit and receive wireless signals to/from eNB 104.

Processor module 152 may be coupled to receiver module 144 and transmitter module 148 and be configured to decode and encode information transmitted in signals communicated between the UE 108 and the eNB 104. Processor module may include a communication module 154 and a HARQ module 158. Processor module 152 may be configured to use communication module 154 to transmit information in uplink subframes of the PCell, e.g., on CC_0, according to the scheduling of a first UL-DL subframe configuration at a first frequency. Processor module 152 may also be configured to transmit information in uplink subframes of the SCell, e.g., on CC_1, according to a second UL-DL subframe configuration at a second frequency that is different from the first frequency. According to one embodiment, the difference between transmission frequencies of CC_0 and CC_1 may range from hundreds of kilohertz to tens of Gigahertz, in accordance with inter-band carrier aggregation. In some embodiments, processor module 152 may use HARQ module 158 to select HARQ timing sequence or timing schedules based on one of the UL-DL subframe configurations of PCell or SCell.

Similarly, the processor module 128 of eNB 104 may be coupled with a communication module 162 and a HARQ module 166. Processor module 128 may be configured to use communication module 162 to transmit information in downlink subframes of the PCell and/or SCell, as described above with respect to the uplink subframes of processor module 152.

As will be described in more detail hereafter, processor module 128 may be configured to selectively transmit ACK/NACK information for SCell communications via a UL-DL subframe configuration that is different than the UL-DL subframe configuration of SCell. In embodiments, processor module 128 may use HARQ module 166 to select a HARQ timing sequence or timing schedule based on one of the UL-DL subframe configurations. HARQ module 166 may also generate the ACK/NACK information for processor module 128. The HARQ module 166 may be coupled with the communication module 162 and may be configured to use the communication module 162 to transmit the generated ACK/NACK information via the selected HARQ timing sequence.

An advantage of a TDD system may be flexible resource utilization through the use of different UL-DL subframe configurations such as the configurations 0-6 described above. The UL-DL subframe configurations may be selected to achieve higher efficiencies for uplink and downlink traffic in a cell. As shown above in Table 1, the ratio between available UL and DL resources can range from 3UL:2DL in configuration 0 to 1UL:9DL as shown in configuration 5. In some embodiments it may be desirable for different UL-DL subframe configurations to be used on different cells. For example, the PCell may use a different configuration from the SCell. The use of different UL-DL subframe configurations may offer benefits such as legacy system coexistence, heterogeneous network (HetNet) support, aggregation of traffic-dependent carriers, flexible configurations where a greater number of UL subframes are available for better coverage in lower bandwidth uses while a higher number of DL subframes are available for higher bandwidth uses, and a higher peak rate.

In embodiments where CA is used, cross-carrier scheduling may be performed. In general, the cross-carrier scheduling may involve an indication that one serving cell is a scheduling cell, and another serving cell is a scheduled cell. For example, the PCell may be the scheduling cell, and the SCell may be the scheduled cell. In other embodiments where the cell contains multiple SCells, a first SCell may be a scheduling cell and a second SCell may be a scheduled cell. In these embodiments, the scheduled cell may be used to transmit data from the UE 108 to the eNB 104, and the scheduling cell, for example the PCell, may be used to transmit the HARQ ACK/NACK information from the eNB 104 to the UE 108. This specification will continue to discuss embodiments with regard to the terms scheduling cells and scheduled cells.

In these embodiments where cross-carrier scheduling is used, the use of different UL-DL subframe configurations may impact the spectrum efficiency of uplink resources. This is because the 3GPP LTE specifications may require at least four subframes between the UL data transmission and the corresponding DL ACK/NACK transmission. However, resource utilization of UL subframes in the scheduled cells may not be perfectly efficient because the scheduling and scheduled cells may use different UL-DL subframe configurations and therefore have different scheduling timing. Scheduling timing may refer to the specific timing and configuration of UL, DL, or S subframes within a radio frame for the cell as directed by the UL-DL subframe configuration of the cell. If the scheduling timing of the scheduling and scheduled cells are different, then the subframe of the scheduling cell may be a UL subframe whereas the same subframe of the scheduled cell may be a DL subframe, or vice versa, as discussed below in further detail. A UL transmission on the scheduled cell according to one UL-DL subframe configuration, for example from the UE 108, may therefore not have a corresponding DL subframe for an ACK/NACK transmission in the scheduling cell, for example from the eNB 104.

Figure 2:
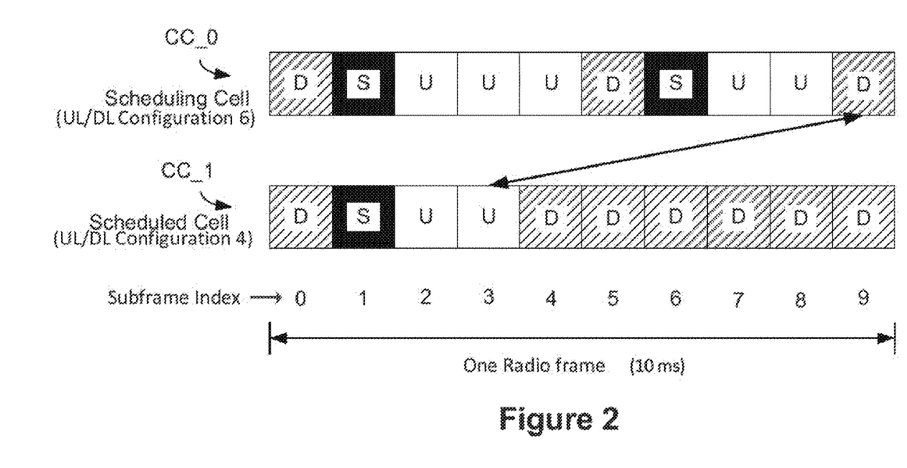
FIG. 2 schematically illustrates an optional hybrid adaptive repeat and request (HARQ) signal scheduling diagram in accordance with various embodiments.

An example of inefficient UL resource utilization due to different scheduling timing between the scheduled and scheduling cells is shown in FIG. 2. The UL-DL subframe configuration of the scheduling cell may be configuration 6, and include three normal DL subframes D, two special subframes S, and five UL subframes U. The UL-DL subframe configuration of the scheduled cell may be configuration 4 and include seven normal DL subframes D, one special subframe S, and two UL subframes U. If the PUSCH scheduling timing of the UL-DL subframe configuration of the scheduled cell, e.g. configuration 4, is used for PUSCH transmission on the scheduled cell in this embodiment, then only UL subframe 3 on the scheduled cell could be used for uplink data transmission. Correspondingly, ACK/NACK information could only be received on subframe 9 of the scheduling cell, as indicated by the solid arrow. Subframe 2 may be unusable because the corresponding scheduling subframe on the scheduling cell may be a UL subframe rather than a DL subframe, e.g. subframe 8 on the scheduling cell as shown in FIG. 2, and consequently UL grant/PHICH information associated with subframe 2 may not be transmitted. Therefore, only subframe 3 may be usable, which may reduce UL resource efficiency of the scheduled cell by 50%. Different embodiments and combinations may have similar, greater, or lesser resource efficiency reductions.

Figure 3:
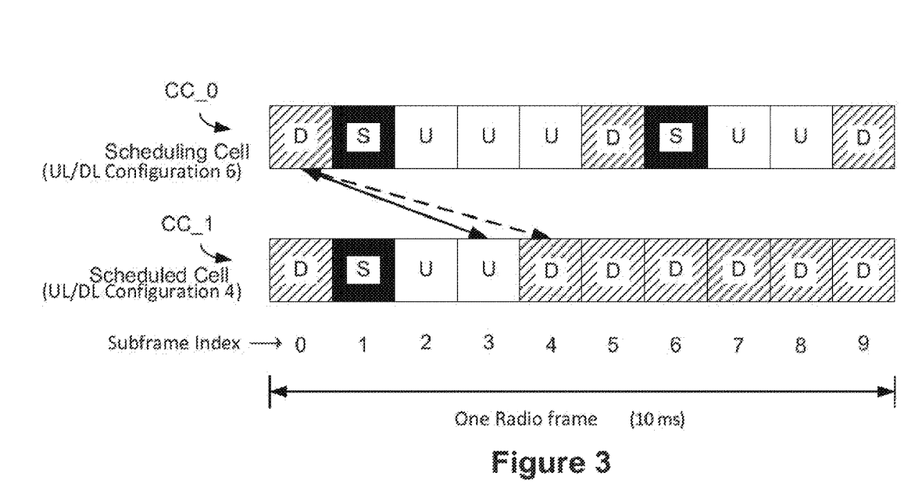
FIG. 3 schematically illustrates an optional HARQ signal scheduling diagram in accordance with various embodiments.

An alternative method may be to use the scheduling timing of the UL-DL subframe configuration of the scheduling cell, as shown in FIG. 3. However, as shown in FIG. 3, the UL data transmission from the scheduled cell in subframe 3 may be processed by the scheduling cell, and the scheduling cell may send a DL ACK/NACK transmission in subframe 0 of the next radio frame, as shown by the solid line. However, as indicated by the dashed line, the next available UL transmission for non-adaptive retransmission triggered by NACK information in the PHICH channel, for example NACK information transmitted when the eNB 104 does not receive a data transmission from the UE 108 correctly, may begin at subframe 4 according to the scheduling timing of the scheduling cell. In this embodiment where the timing of the scheduling cell is used, however, subframe 4 may be a DL subframe and therefore not be usable for a subsequent UL data transmission, as indicated by the dashed line. In this embodiment, the next available UL subframe may not be until subframe 2 of the following radio frame. This delay in the HARQ process may undesirably decrease the efficiency of UL resource utilization.

Figure 4:
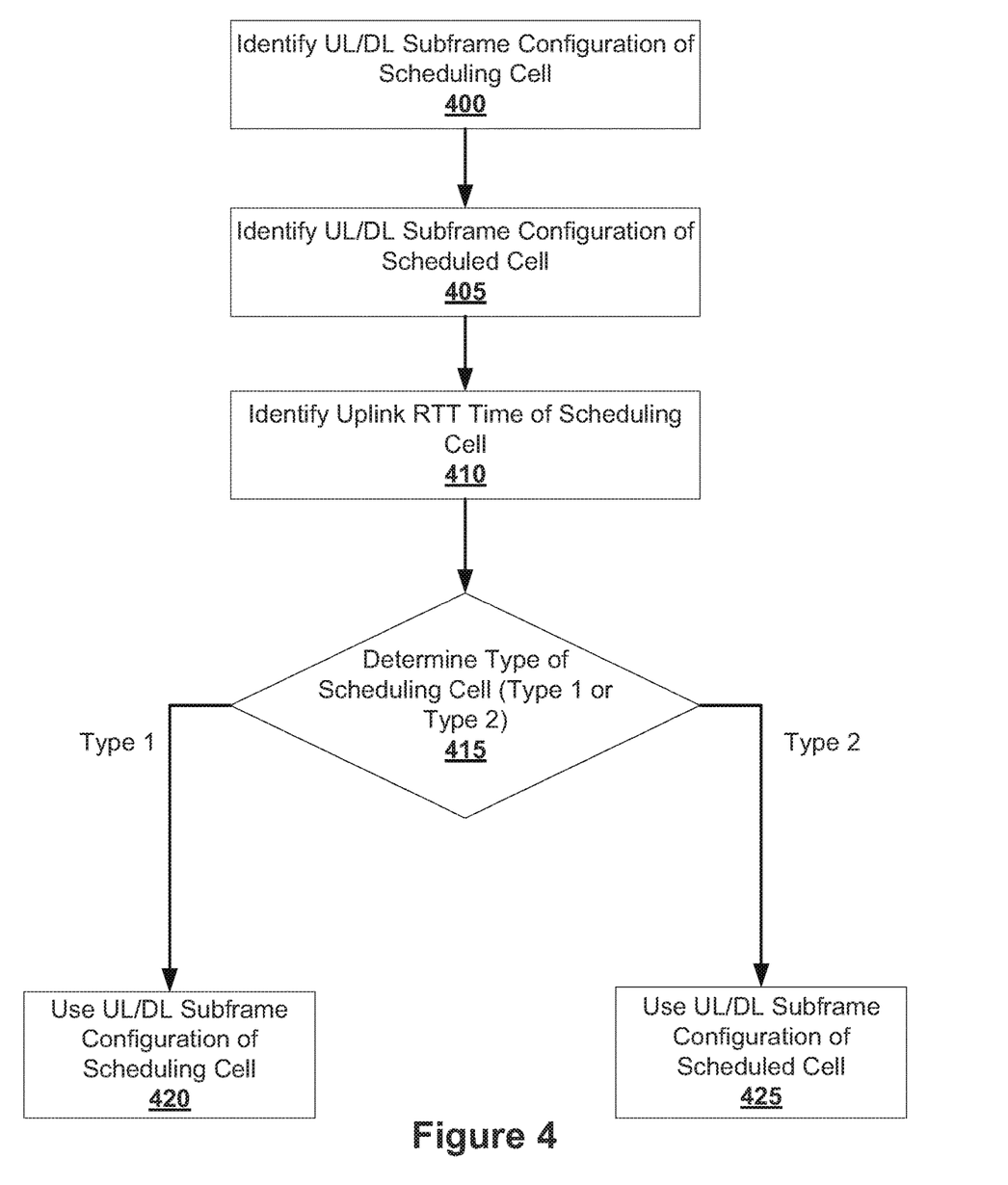
FIG. 4 is a flowchart illustrating selection of a HARQ signal scheduling configuration in accordance with various embodiments.

FIG. 4 depicts a flowchart of a method for coordinating the UL-DL subframe configurations and increasing uplink efficiency of cross-carrier scheduled TDD cells for a UL HARQ process according to one embodiment. In this method the UL-DL subframe configuration of a scheduling cell is identified at 400. The UL-DL subframe configuration of a scheduled cell is then identified at 405. It will be understood that the identification at 400 and 405 may occur sequentially or substantially simultaneously. After identifying the UL-DL subframe configuration of the scheduling and scheduled cells, the UL RTT of the scheduling cell may be identified at 410. The UL RTT may be the time that it takes a HARQ process to occur. Some UL-DL subframe configurations may have an RTT of 10 milliseconds (ms). Specifically, UL-DL subframe configurations such as configurations 1, 2, 3, 4, and 5 may have an RTT of 10 ms. These configurations may be designated "Type 1" configurations at 415. Other UL-DL subframe configurations, for example configurations 0 or 6, may have an RTT of between 10 to 13 ms and be designated "Type 2" configurations at 415. The designations of "Type 1" or "Type 2" are arbitrary names, and the names of the types may be different in different embodiments. The designations stated above will be used for the remainder of the specification, however it will be understood that different names may be used in alternative embodiments of the method described herein.

If the UL-DL subframe configuration of the scheduling cell is designated as Type 1, then the scheduling timing of the HARQ process may follow the UL-DL subframe configuration of the scheduling cell at 420. Alternatively, if the UL-DL subframe configuration of the scheduling cell is designated as Type 2, then the scheduling timing of the HARQ process may follow the UL-DL subframe configuration of the scheduled cell at 425. Alternative embodiments may have additional types or ways of determining the different types of the UL-DL subframe configurations.

In some embodiments, the method of FIG. 4 may be performed by an eNB 104, and in other embodiments the method may be performed by a UE 108. In certain embodiments, the method may be performed by both the UE 108 and the eNB 104 so that both entities are able to independently determine which UL-DL subframe configuration to use for UL-DL transmission in the HARQ process. In other embodiments, the UE 108 may perform the method and then transmit a signal to the eNB 104 which instructs the eNB 104 as to which UL-DL subframe configuration to use for UL-DL transmission in the HARQ process. Alternatively, the eNB 104 may perform the method and then transmit a signal to the UE 108 which instructs the UE 108 which UL-DL subframe configuration to use for UL-DL transmission in the HARQ process. If the method is being performed by the UE 108, then the UE 108 may identify the UL-DL subframe configurations of the scheduling cell at 400 and the scheduled cell 405 by receiving and analyzing an SIB1 from the eNB 104 as described above.

Figure 5:
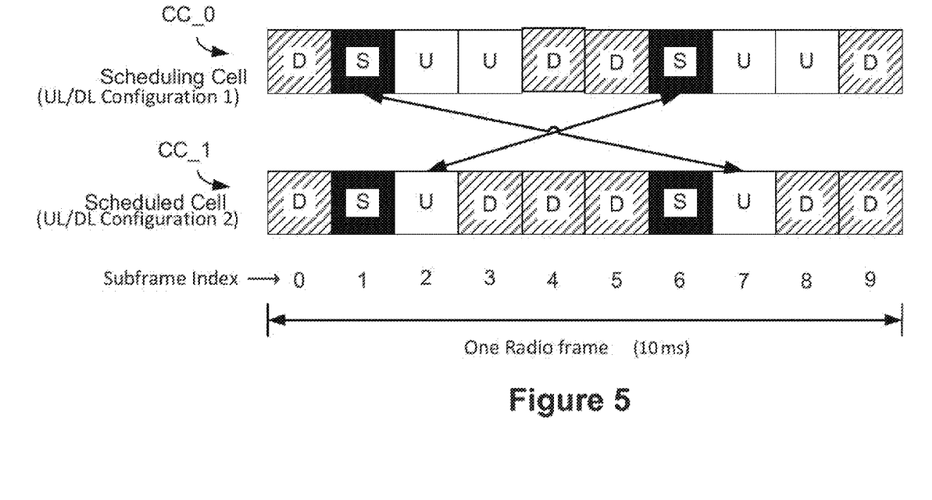
FIG. 5 schematically illustrates an optional HARQ signal scheduling diagram in accordance with a first method of various embodiments.

As shown in FIG. 5, use of the method shown in FIG. 4 may increase uplink resource efficiency. In this embodiment, the scheduling cell may be using a UL-DL subframe configuration such as configuration 1, and the scheduled cell may be using a UL-DL subframe configuration such as configuration 2. As noted above with respect to 415, both configurations 1 and 2 may be designated as Type 1 configurations. Therefore, according to 415 and 420, the scheduling and scheduled cells may use the UL-DL subframe configuration of the scheduling cell, i.e. configuration 1.

As shown in FIG. 5, using the UL-DL subframe configuration of the scheduling cell, configuration 1, the scheduled cell is able to transmit UL data in subframe 2 from the UE 108 to the eNB 104 and receive a corresponding ACK/NACK signal from the eNB 104 on the DL in subframe 6 of the scheduling cell. A separate HARQ process may be able to transmit UL data from the UE 108 to the eNB 104 in subframe 7 and receive a corresponding ACK/NACK signal from the eNB 104 in subframe 1 of the next radio frame of the scheduling cell.

Figure 6:
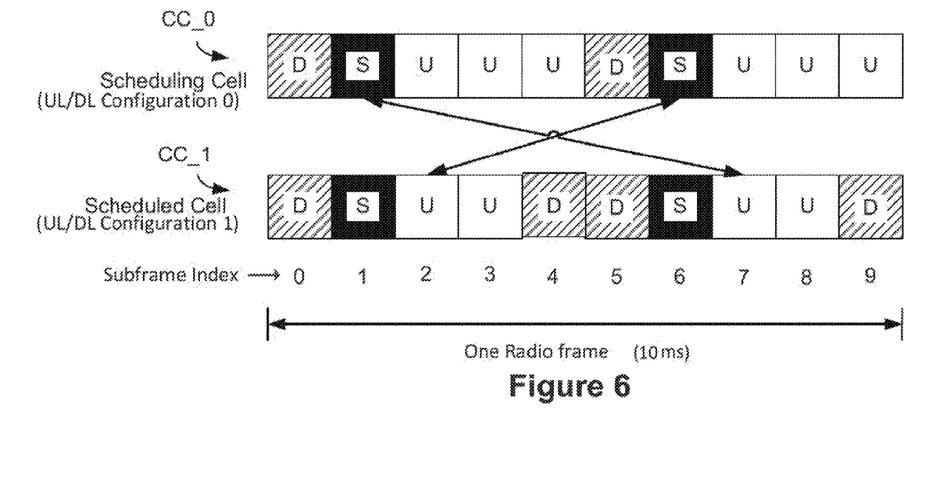
FIG. 6 schematically illustrates an optional HARQ signal scheduling diagram in accordance with a first method of various embodiments.

An alternative embodiment is shown in FIG. 6. In FIG. 6 the scheduling cell may be using a UL-DL subframe configuration such as configuration 0, and the scheduled cell may be using a UL-DL subframe configuration such as configuration 1. As noted above with respect to 415, configuration 0 may be designated a Type 2 configuration and configuration 1 may be a Type 1 configuration. Therefore, according to 415 and 425, the scheduling and scheduled cells may use the UL-DL subframe configuration of the scheduled cell, configuration 1.

As shown in FIG. 6, the scheduled cell is able to transmit UL data from the UE 108 to the eNB 104 in subframe 2, and receive a corresponding ACK/NACK signal from the eNB 104 in subframe 6 of the scheduling cell. A separate HARQ process may also be performed wherein the UE 108 transmits UL data in subframe 7 of the scheduled cell and receives a corresponding ACK/NACK signal from the eNB 104 in subframe 1 of the next radio frame of the scheduling cell.

The embodiments described above with respect to FIGS. 5 and 6 are examples. Alternative embodiments may follow the logic of the method described in FIG. 4 with respect to different combinations of UL-DL subframe configurations.

Figure 7:
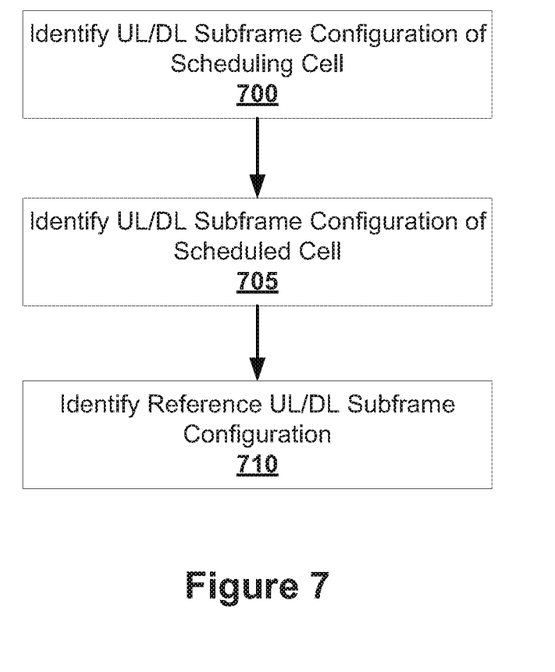
FIG. 7 is a flowchart illustrating selection of a HARQ signal scheduling configuration in accordance with various embodiments.

FIG. 7 depicts a method of an alternative embodiment for increasing uplink efficiency in a HARQ process of cross-carrier scheduled TDD cells. The UL-DL subframe configurations of a scheduling and scheduled cell may be identified at 700 and 705, respectively. A reference UL-DL subframe configuration may then be identified at 710. In some embodiments, the reference UL-DL subframe configuration may be the same as the UL-DL subframe configuration of the scheduling cell. In other embodiments the reference UL-DL subframe configuration may be the same as the UL-DL subframe configuration of the scheduled cell. In still other embodiments the reference UL-DL subframe configuration may be different from the UL-DL subframe configuration of either the scheduling or scheduled cell. In some embodiments, multiple reference UL-DL subframe configurations may be identified.

In general, the reference UL-DL subframe configuration may be identified at 710 through comparison of the UL-DL subframe configuration of the scheduling cell and the UL-DL subframe configuration of the scheduled cell. Specifically, if the method is being performed by an eNB 104, then the eNB 104 may compare the UL-DL subframe configurations of the scheduling cell and the scheduled cell against a table which may be stored in a memory of the eNB 104.

In some embodiments the table may be stored on a server or other device communicatively coupled with the eNB 104. The table may identify a reference UL-DL subframe configuration based on one or both of the UL-DL subframe configurations of the scheduling and scheduled cells. The eNB 104 may then communicate the reference UL-DL subframe configuration to a UE 108 via RRC signaling.

In an alternative embodiment, the UE 108 may receive an indication of the UL-DL subframe configurations of the scheduling cell and the scheduled cell from the eNB 104, for example as information in a SIB1 received in a signal on the PDSCH, as described above. The UE 108 may then consult a table which compares one or both of the UL-DL subframe configurations of the scheduling and scheduled cells to determine which reference UL-DL subframe configuration to use for a HARQ process. In some embodiments the table may be stored in a memory of the UE 108. In other embodiments, the table may be stored on another device such as an external memory or a server that is communicatively coupled with the UE 108.

Figure 8:
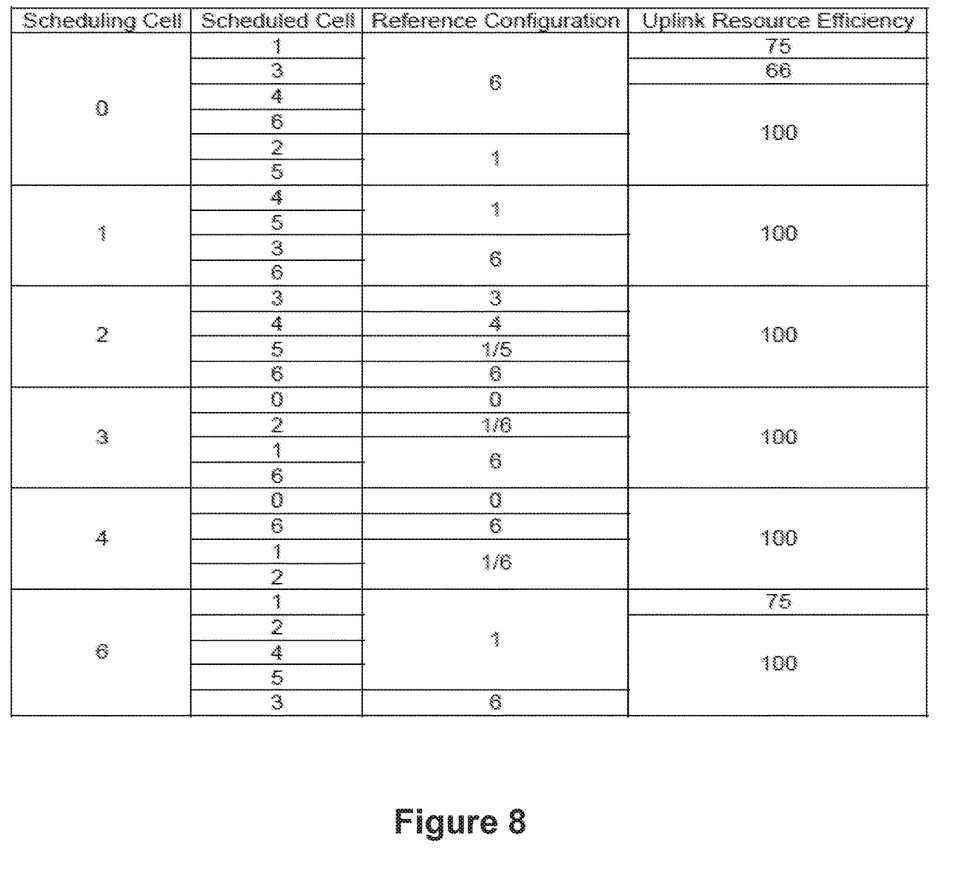
FIG. 8 is a table illustrating an optional HARQ configuration selection in accordance with a second method of various embodiments.

FIG. 8 depicts an exemplary embodiment of a table that may be used to determine a reference UL-DL subframe configuration for a HARQ process according to the method described above in FIG. 7. Specifically, the first column of the table in FIG. 8 depicts a UL-DL subframe configuration of a scheduling cell. The second column of the table in FIG. 8 depicts a UL-DL subframe configuration of a scheduled cell. The third column of the table in FIG. 8 depicts a reference UL-DL subframe configuration that may be used for the UL-DL subframe configurations of the scheduling and the scheduled cell.

In the embodiment of FIG. 8, the reference UL-DL subframe configuration is 6 if the UL-DL subframe configuration of the scheduling cell is 0 and the UL-DL subframe configuration of the scheduled cell is 1, 3, 4, or 6, or if the UL-DL subframe configuration of the scheduling cell is 1 and the UL-DL subframe configuration of the scheduled cell is 3 or 6; the reference UL-DL subframe configuration is 1 if the UL-DL subframe configuration of the scheduling cell is 0 and the UL-DL subframe configuration of the scheduled cell is 2 or 5, or if the UL-DL subframe configuration of the scheduling cell is 1 and the UL-DL subframe configuration of the scheduled cell is 4 or 5; the reference UL-DL subframe configuration is the scheduled cell configuration if the UL-DL subframe configuration of the scheduling cell is 2 and the UL-DL subframe configuration of the scheduled cell is 3, 4, or 6; the reference UL-DL subframe configuration is 5 or 1 if the UL-DL subframe configuration of the scheduling cell is 2 and the UL-DL subframe configuration of the scheduled cell is 5; the reference UL-DL subframe configuration is 1 if the UL-DL subframe configuration of the scheduling cell is 6, and the UL-DL subframe configuration of the scheduled cell is 1, 2, 4, or 5; the reference UL-DL subframe configuration is 6 if the UL-DL subframe configuration of the scheduling cell is 6 and the UL-DL subframe configuration of the scheduled cell is 3; the reference UL-DL subframe configuration is 0 if the UL-DL subframe configuration of the scheduling cell is 3 or 4, and the UL-DL subframe configuration of the scheduled cell is 0; the reference UL-DL subframe configuration is 6 if the UL-DL subframe configuration of the scheduling cell is 3 and the UL-DL subframe configuration of the scheduled cell is 1, or if the UL-DL subframe configuration of the scheduling cell is 3 or 4 and the UL-DL subframe configuration of the scheduled cell is 6; and the reference UL-DL subframe configuration is 1 or 6 if the UL-DL subframe configuration of the scheduling cell is 4 and the UL-DL subframe configuration of the scheduled cell is 1, or if the UL-DL subframe configuration of the scheduling cell is 3 or 4 and the UL-DL subframe configuration of the scheduled cell is 2.

The fourth column of the table in FIG. 8 depicts uplink resource efficiencies that may be achieved by using the reference configurations shown in this embodiment. For example, if the UL-DL subframe configuration of the scheduling cell is equal to 0 and the UL-DL subframe configuration of the scheduled cell is equal to 1, then there may be 75% uplink resource efficiency, or 75% of the UL subframes of the UL-DL subframe configuration 1 of the scheduled cell may be usable for a HARQ process. Similarly, if the UL-DL subframe configuration of the scheduled cell is equal to 6 and the UL-DL subframe configuration of the scheduled cell is equal to 1, then the uplink resource efficiency may also be 75%. In the present embodiment if the UL-DL subframe configuration of the scheduling cell is equal to 0 and the UL-DL subframe configuration of the scheduled cell is equal to 3, then the uplink resource efficiency may be 66%. In the other combinations of UL-DL subframe configurations of the scheduling and scheduled cells of the present embodiment, the uplink resource efficiency may be as high as 100%. In other embodiments the uplink resource efficiency may be higher or lower for different combinations, dependent on which reference UL-DL subframe configuration is used.

Figure 9:
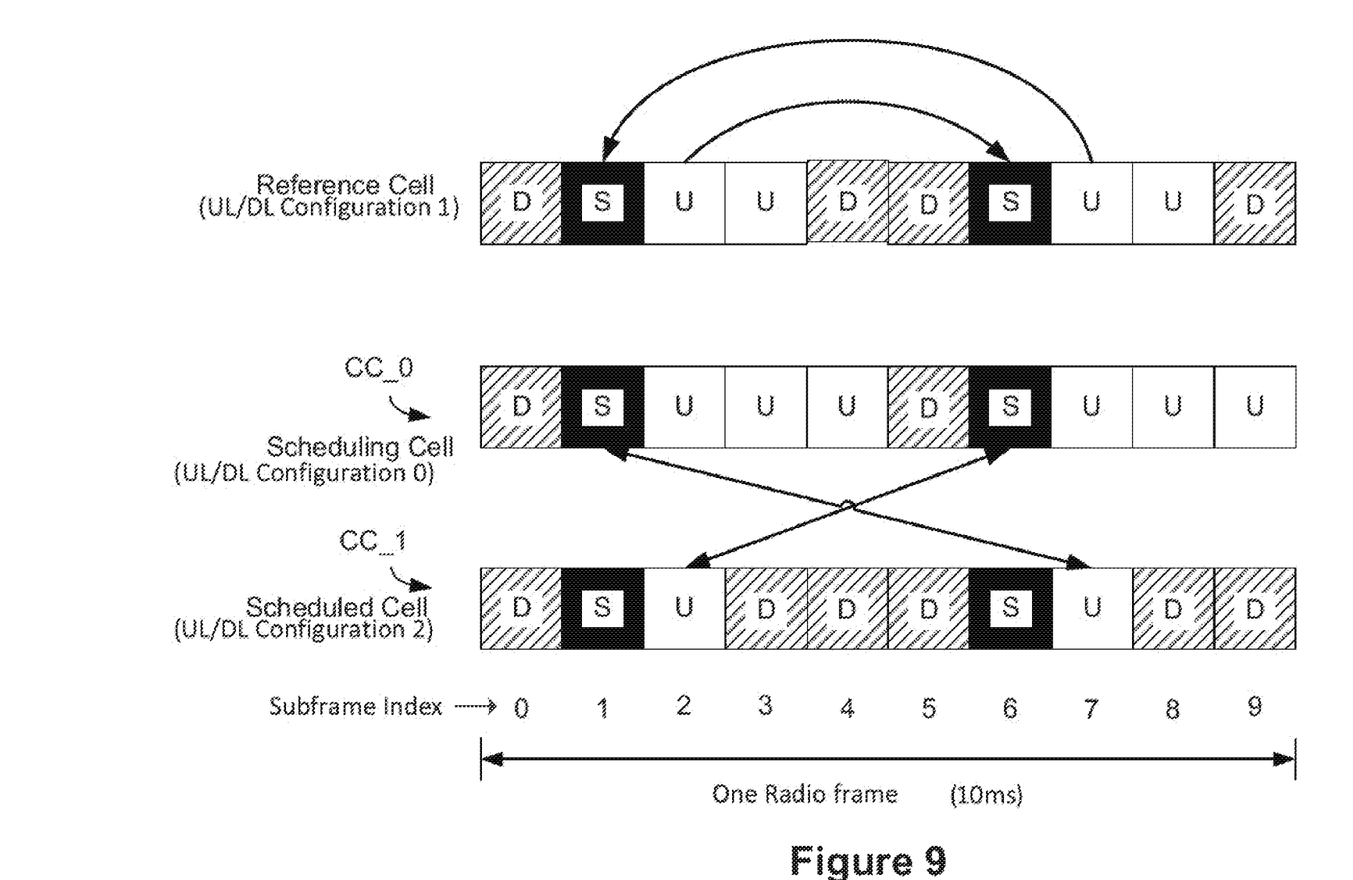
FIG. 9 schematically illustrates an optional HARQ signal scheduling diagram in accordance with a second method of various embodiments.

FIG. 9 depicts the use of a UL-DL subframe configuration of a reference cell according to one embodiment. In this embodiment the UL-DL subframe configuration of the scheduling cell is 0. The UL-DL subframe configuration of the scheduled cell is 2. As indicated by the table of FIG. 8, the reference UL-DL subframe configuration may then be 1. As shown in FIG. 9, the UE 108 may transmit UL data in subframe 2 of the scheduled cell and, using the reference UL-DL subframe configuration, receives a DL ACK/NACK signal in subframe 6 of the scheduling cell from the eNB 104. A separate HARQ process may also occur wherein the UE 108 transmits UL data in subframe 7 of the scheduled cell and receives a DL ACK/NACK signal in subframe 2 of the following radio frame of the scheduling cell. In this embodiment it can be seen that 100% of the UL resources of the scheduled cell may be utilized, as indicated by the table of FIG. 8.

Figure 10:
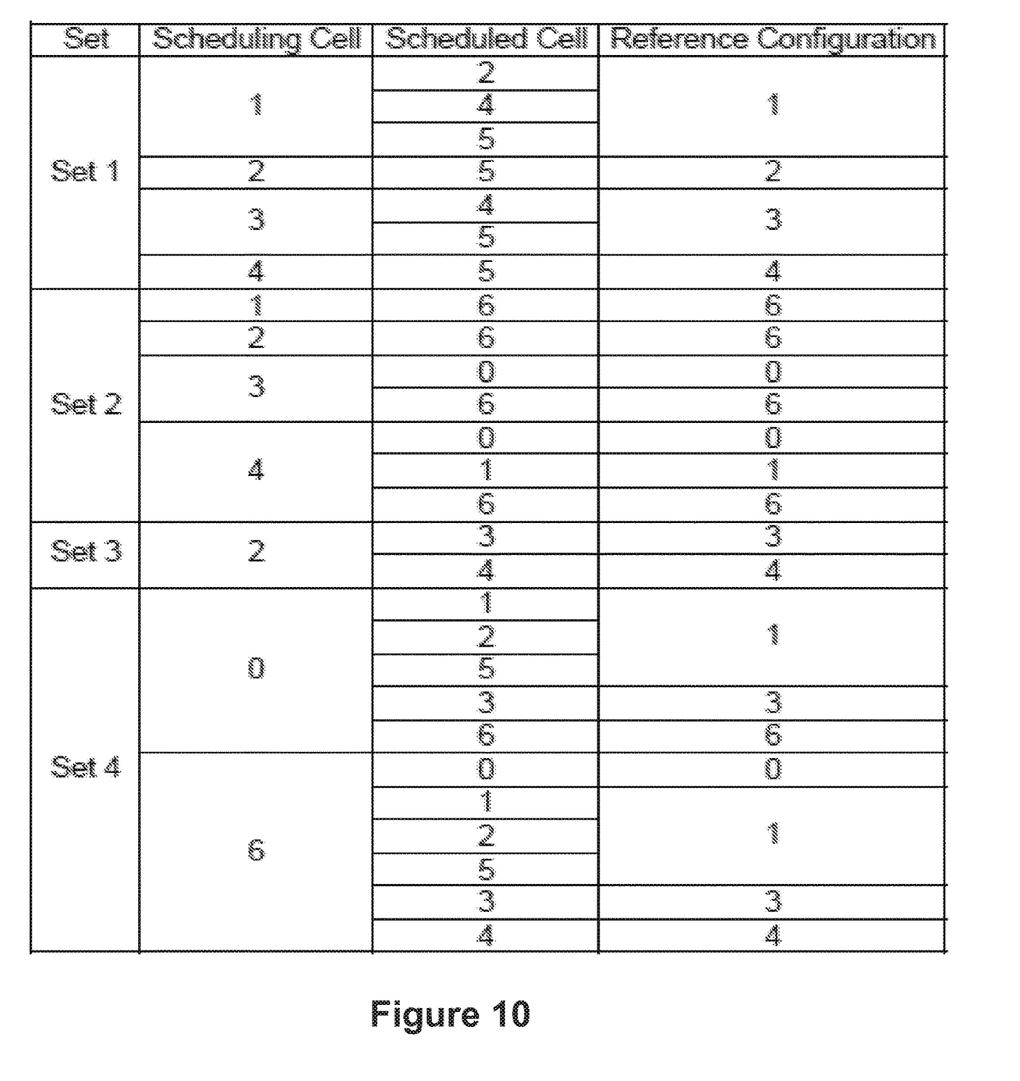
FIG. 10 is a table illustrating another optional HARQ configuration selection in accordance with the second method of various embodiments.

FIG. 10 depicts another exemplary embodiment of a table that may be used to determine a reference UL-DL subframe configuration for a HARQ process according to the method described above in FIG. 7. Specifically, the first column of the table in FIG. 10 depicts a plurality of sets of reference UL-DL subframe configurations, dependent on the UL-DL subframe configuration of the scheduling cell and scheduled cell. The second column depicts a UL-DL subframe configuration of a scheduling cell. The third column of the table in FIG. 10 depicts a UL-DL subframe configuration of a scheduled cell. The fourth column of the table in FIG. 10 depicts a reference UL-DL subframe configuration that may be used for the determination of the PUSCH HARQ timing for the scheduled cell.

In the first set, the reference UL-DL subframe configuration is equal to 1 if the UL-DL subframe configuration of the scheduling cell is equal to 1 and the UL-DL subframe configuration of the scheduled cell is equal to 2, 4, or 5; the reference UL-DL subframe configuration is equal to 2 if the UL-DL subframe configuration of the scheduling cell is equal to 2 and the UL-DL subframe configuration of the scheduled cell is equal to 5; the reference UL-DL subframe configuration is equal to 3 if the UL-DL subframe configuration of the scheduling cell is equal to 3 and the UL-DL subframe configuration of the scheduled cell is equal to 4 or 5; and the reference UL-DL subframe configuration is equal to 4 if the UL-DL subframe configuration of the scheduling cell is equal to 4 and the UL-DL subframe configuration of the scheduled cell is equal to 5.

In the second set, the reference UL-DL subframe configuration is equal to 6 if the UL-DL subframe configuration of the scheduling cell is equal to 1, 2, 3, or 4, and the UL-DL subframe configuration of the scheduled cell is equal to 6; the reference UL-DL subframe configuration is equal to 0 if the UL-DL subframe configuration of the scheduling cell is equal to 3 or 4, and the UL-DL subframe configuration of the scheduled cell is equal to 0; and the reference UL-DL subframe configuration is equal to 1 if the UL-DL subframe configuration of the scheduling cell is equal to 4 and the UL-DL subframe configuration of the scheduled cell is equal to 1.

In the third set, the reference UL-DL subframe configuration is equal to 3 if the UL-DL subframe configuration of the scheduling cell is equal to 2 and the UL-DL subframe configuration of the scheduled cell is equal to 3; and the reference UL-DL subframe configuration is equal to 4 if the UL-DL subframe configuration of the scheduling cell is equal to 2 and the UL-DL subframe configuration of the scheduled cell is equal to 4.

In the fourth set, the reference UL-DL subframe configuration is equal to 0 if the UL-DL subframe configuration of the scheduling cell is equal to 6 and the UL-DL subframe configuration of the scheduled cell is equal to 0; the reference UL-DL subframe configuration is equal to 1 if the UL-DL subframe configuration of the scheduling cell is equal to 0 or 6, and the UL-DL subframe configuration of the scheduled cell is equal to 1, 2, or 5; the reference UL-DL subframe configuration is equal to 3 if the UL-DL subframe configuration of the scheduling cell is equal to 0 or 6, and the UL-DL subframe configuration of the scheduled cell is equal to 3; the reference UL-DL subframe configuration is equal to 6 if the UL-DL subframe configuration of the scheduling cell is equal to 0 and the UL-DL subframe configuration of the scheduled cell is equal to 6; and the reference UL-DL subframe configuration is equal to 4 if the UL-DL subframe configuration of the scheduling cell is equal to 6 and the UL-DL subframe configuration of the scheduled cell is equal to 4.

The method of FIG. 7 may use a single set, for example only set 1 as shown in the table of FIG. 10, or the method may use a combination of two or more of the sets to identify the reference UL-DL subframe configuration at 710. In some embodiments, additional combinations of reference UL-DL subframe configurations, UL-DL subframe configurations of the scheduling cell, and UL-DL subframe configurations of the scheduled cell, not shown in FIG. 10, may be used in combination with those shown above in FIG. 10. For example, additional embodiments may include reference UL-DL subframe configurations for combinations of the UL-DL subframe configurations of the scheduling and scheduled cell which are not shown in FIG. 8 or 10.

It will be noted that the table of FIG. 10 contains elements of both the method of FIG. 4 and the table of FIG. 8. For example, the table of FIG. 10 depicts the use of the UL-DL subframe configuration of the scheduling cell as a reference UL-DL subframe configuration if the UL-DL subframe configuration of the scheduling cell is a Type 1 configuration as described above at element 420 of FIG. 4. For example, the table of FIG. 10 indicates that a UL-DL reference configuration of 1 may be used if the UL-DL subframe configuration of the scheduling cell is 1 and the UL-DL subframe configuration of the scheduled cell is 2. Similarly, FIG. 10 depicts the use of the UL-DL subframe configuration of the scheduled cell as a reference UL-DL subframe configuration if the UL-DL subframe configuration of the scheduled cell is a Type 2 configuration as described above at element 425 of FIG. 4. For example, the table of FIG. 10 indicates that a UL-DL reference configuration of 4 may be used if the UL-DL subframe configuration of the scheduling cell is 6 and the UL-DL subframe configuration of the scheduled cell is 4, Similarly, FIG. 10 indicates that a UL-DL reference configuration of 6 may be used if the UL-DL subframe configuration of the scheduling cell is 3 and the UL-DL subframe configuration of the scheduled cell is 6, as shown in the table of FIG. 8. Some combinations of FIG. 10, for example the use of a UL-DL reference subframe configuration of 1 if the UL-DL subframe configuration of the scheduling cell is 1 and the UL-DL subframe configuration of the scheduled cell is 4, correspond to both the table of FIG. 8 and the method of FIG. 4.

Other embodiments may use fewer or different combinations of the reference UL-DL configuration, a UL-DL subframe configuration of a scheduling cell, and a UL-DL subframe configuration of a scheduled cell shown in FIG. 8 or 10, or derived from the method of FIG. 4. These embodiments may include additional combinations of a reference UL-DL configuration, a UL-DL subframe configuration of a scheduling cell, and a UL-DL subframe configuration of a scheduled cell not shown in FIG. 8 or 10 or derived from the method of FIG. 4.

Figure 11:
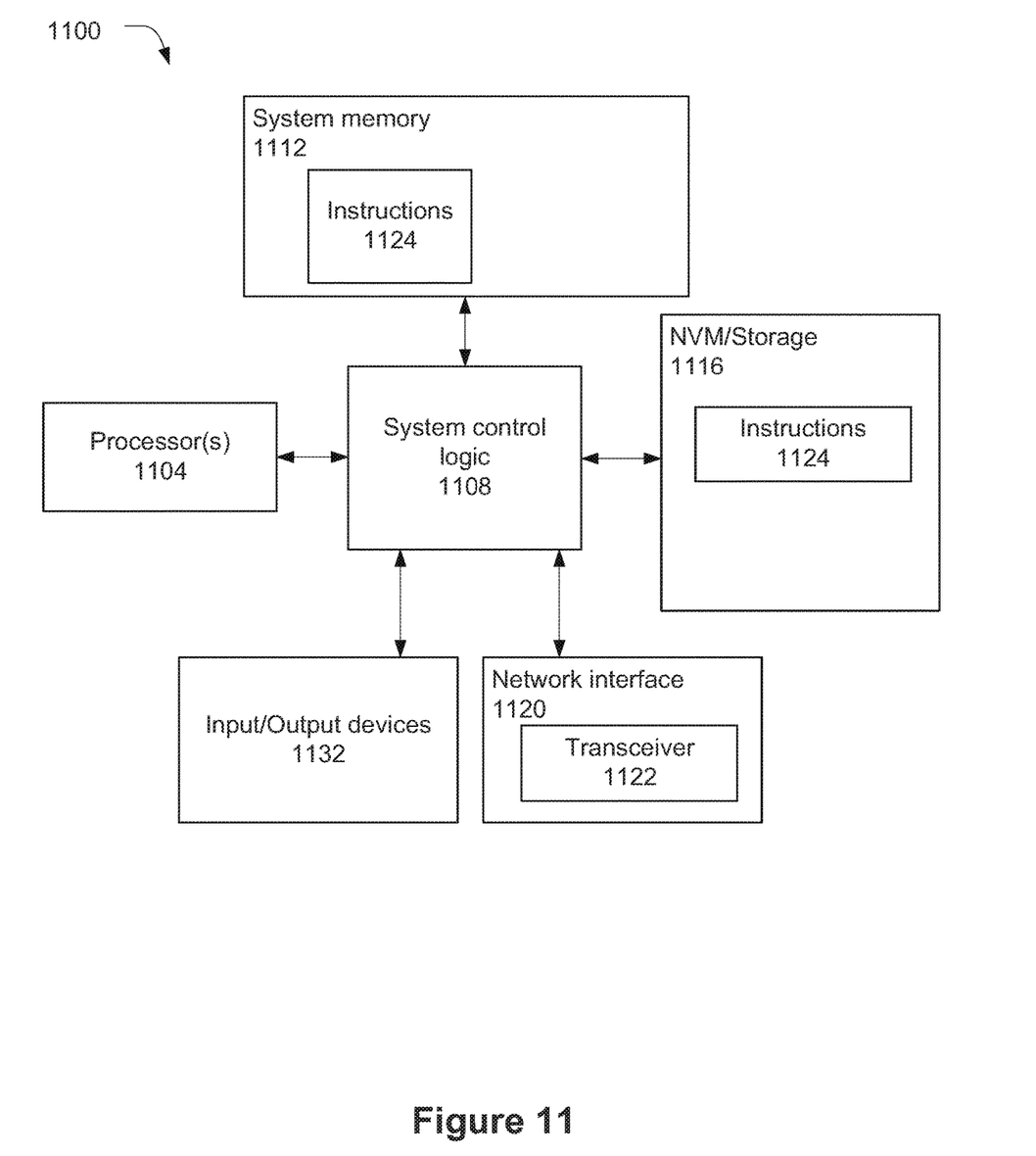
FIG. 11 schematically depicts an example system in accordance with various embodiments.

The eNB 104 and UE 108 described herein may be implemented into a system using any suitable hardware and/or software to configure as desired. FIG. 11 illustrates, for one embodiment, an example system 1100 comprising one or more processor(s) 1104, system control logic 1108 coupled with at least one of the processor(s) 1104, system memory 1112 coupled with system control logic 1108, non-volatile memory (NVM)/storage 1116 coupled with system control logic 1108, and a network interface 1120 coupled with system control logic 1108.

Processor(s) 1104 may include one or more single-core or multi-core processors. Processor(s) 1104 may include any combination of general-purpose processors and dedicated processors (e.g., graphics processors, application processors, baseband processors, etc.). In an embodiment in which the system 1100 implements UE 108, processors(s) 1104 may include processor module 152 and be configured to execute the embodiments of FIGS. 2-9 in accordance with various embodiments. In an embodiment in which the system 1100 implements eNB 104, processor(s) 1104 may include processor module 128 and be configured to decode the HARQ ACK/NACK information transmitted by UE 108.

System control logic 1108 for one embodiment may include any suitable interface controllers to provide for any suitable interface to at least one of the processor(s) 1104 and/or to any suitable device or component in communication with system control logic 1108.

System control logic 1108 for one embodiment may include one or more memory controller(s) to provide an interface to system memory 1112. System memory 1112 may be used to load and store data and/or instructions, for example, for system 1100. System memory 1112 for one embodiment may include any suitable volatile memory, such as suitable dynamic random access memory (DRAM), for example.

NVM/storage 1116 may include one or more tangible, non-transitory computer-readable media used to store data and/or instructions, for example. NVM/storage 1116 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1116 may include a storage resource physically part of a device on which the system 1100 is installed or it may be accessible by, but not necessarily a part of, the device. For example, the NVM/storage 1116 may be accessed over a network via the network interface 1120.

System memory 1112 and NVM/storage 1116 may respectively include, in particular, temporal and persistent copies of instructions 1124. Instructions 1124 may include instructions that when executed by at least one of the processor(s) 1104 result in the system 1100 implementing a one or both of methods 400 and 700 as described herein. In some embodiments, instructions 1124, or hardware, firmware, and/or software components thereof, may additionally/alternatively be located in the system control logic 1108, the network interface 1120, and/or the processor(s) 1104.

Network interface 1120 may have a transceiver 1122 to provide a radio interface for system 1100 to communicate over one or more network(s) and/or with any other suitable device. The transceiver 1122 may be implement receiver module 144 and/or transmitter module 148. In various embodiments, the transceiver 1122 may be integrated with other components of system 1100. For example, the transceiver 1122 may include a processor of the processor(s) 1104, memory of the system memory 1112, and NVM/Storage of NVM/Storage 1116. Network interface 1120 may include any suitable hardware and/or firmware. Network interface 1120 may include a plurality of antennas to provide a multiple input, multiple output radio interface. Network interface 1120 for one embodiment may include, for example, a network adapter, a wireless network adapter, a telephone modem, and/or a wireless modem.

For one embodiment, at least one of the processor(s) 1104 may be packaged together with logic for one or more controller(s) of system control logic 1108. For one embodiment, at least one of the processor(s) 1104 may be packaged together with logic for one or more controllers of system control logic 1108 to form a System in Package (SiP). For one embodiment, at least one of the processor(s) 1104 may be integrated on the same die with logic for one or more controller(s) of system control logic 1108. For one embodiment, at least one of the processor(s) 1104 may be integrated on the same die with logic for one or more controller(s) of system control logic 1108 to form a System on Chip (SoC).

The system 1100 may further include input/output (I/O) devices 1132. The I/O devices 1132 may include user interfaces designed to enable user interaction with the system 1100, peripheral component interfaces designed to enable peripheral component interaction with the system 1100, and/or sensors designed to determine environmental conditions and/or location information related to the system 1100.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1120 to communicate with components of a positioning network, e.g., a global positioning system (GPS) satellite.

In various embodiments, the system 1100 may be a mobile computing device such as, but not limited to, a laptop computing device, a tablet computing device, a netbook, a mobile phone, etc. In various embodiments, system 1100 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. One or more non-transitory, computer-readable media (CRM) having instructions, stored thereon, that when executed by one or more processors cause a user equipment (UE) to perform operations, comprising:
   identifying a first uplink/downlink (UL-DL) subframe configuration of a first cell in a wireless time-division duplex (TDD) system;
   identifying a second UL-DL subframe configuration of a second cell, wherein the second cell is a secondary cell, and wherein the UE is to monitor a physical downlink control channel in the first cell to receive scheduling information for the second cell;
   determining whether a combination of the first UL-DL subframe configuration and the second UL-DL subframe configuration belongs to a first set of combinations or a second set of combinations;
   if the combination belongs to the first set of combinations, using a hybrid automatic repeat request (HARQ) acknowledgement timing of the first UL-DL subframe configuration for transmission of a physical uplink shared channel (PUSCH) on the second cell; and
   if the combination belongs to the second set of combinations, using a HARQ acknowledgement timing of the second UL-DL subframe configuration for transmission of a PUSCH on the second cell.

2. The one or more non-transitory CRM of claim 1, wherein the first set of combinations includes the first UL-DL subframe configuration of 1 and the second UL-DL subframe configuration of 2.

3. The one or more non-transitory CRM of claim 2, wherein the second set of combinations includes the first UL-DL subframe configuration of 0 and the second UL-DL subframe configuration of 1.

4. The one or more non-transitory CRM of claim 1, wherein the first cell is a primary cell.

5. The one or more non-transitory CRM of claim 1, wherein the operations of the UE further comprise: communicating on the first and second cells using carrier aggregation.

6. The one or more non-transitory CRM of claim 1, wherein the first set of combinations includes combinations for which the first UL-DL subframe configuration has an uplink round trip time (RTT) for a HARQ process of 10 milliseconds, and wherein the second set of combinations includes combinations for which the first UL-DL subframe configuration has an uplink RTT different than 10 milliseconds.

7. The one or more non-transitory CRM of claim 1, wherein the first and second UL-DL subframe configurations are identified based on respective indications of the first and second UL-DL subframe configurations received by the UE.

8. One or more non-transitory, computer-readable media (CRM) having instructions, stored thereon, that when executed by one or more processors cause an evolved Node B (eNB) of a wireless cellular network to perform operations, comprising:
   identifying a first uplink/downlink (UL-DL) subframe configuration of a first cell in a wireless time-division duplex (TDD) system;
   identifying a second UL-DL subframe configuration of a second cell, wherein the second cell is a secondary cell, and wherein a user equipment (UE) is to monitor a physical downlink control channel in the first cell to receive scheduling information for the second cell;
   determining whether a combination of the first UL-DL subframe configuration and the second UL-DL subframe configuration belongs to a first set of combinations or a second set of combinations;
   if the combination belongs to the first set of combinations, using a hybrid automatic repeat request (HARQ) acknowledgement timing of the first UL-DL subframe configuration for reception of a physical uplink shared channel (PUSCH) from the UE on the second cell; and
   if the combination belongs to the second set of combinations, using a HARQ acknowledgement timing of the second UL-DL subframe configuration for reception of a PUSCH from the UE on the second cell.

9. The one or more non-transitory CRM of claim 8, wherein the first set of combinations includes the first UL-DL subframe configuration of 1 and the second UL-DL subframe configuration of 2.

10. The one or more non-transitory CRM of claim 9, wherein the second set of combinations includes the first UL-DL subframe configuration of 0 and the second UL-DL subframe configuration of 1.

11. The one or more non-transitory CRM of claim 8, wherein the first cell is a primary cell.

12. The one or more non-transitory CRM of claim 8, wherein the operations of the eNB further comprise: communicating with the UE on the second cell using carrier aggregation with the first cell.

13. The one or more non-transitory CRM of claim 8, wherein the first set of combinations includes combinations for which the first UL-DL subframe configuration has an uplink round trip time (RTT) for a HARQ process of 10 milliseconds, and wherein the second set of combinations includes combinations for which the first UL-DL subframe configuration has an uplink RTT different than 10 milliseconds.

14. The one or more non-transitory CRM of claim 8, wherein the instructions, when executed, further cause the eNB to perform operations, comprising: transmitting, to the UE, an indication of the second UL-DL subframe configuration.

15. An apparatus to be implemented in a user equipment (UE), the apparatus comprising:
   a memory; and
   a processor coupled to the memory, and configured to:
      store, in the memory, a first uplink/downlink (UL-DL) subframe configuration of a first cell in a wireless time-division duplex (TDD) system;
      store, in the memory, a second UL-DL subframe configuration of a second cell;
      determine that the second cell is a secondary cell, and wherein the UE is to monitor a physical downlink control channel in the first cell to receive scheduling information for the second cell;
      based on the determination and if the first UL-DL subframe configuration is 1 and the second UL-DL subframe configuration is 2, use a reference UL-DL subframe configuration of 1 to determine a timing for a physical uplink shared channel (PUSCH) on the second cell; and
      based on the determination and if the first UL-DL subframe configuration is 0 and the second UL-DL subframe configuration is 1, use a reference UL-DL subframe configuration of 1 to determine the timing for the PUSCH on the second cell.

16. The apparatus of claim 15, wherein the processor is further configured to encode hybrid automatic repeat request (HARQ) feedback information for transmission in the PUSCH.

17. The apparatus of claim 15, wherein the first cell is a primary cell.

18. The apparatus of claim 15, wherein the processor is further configured to cause the UE to communicate on the first and second cells using carrier aggregation.

19. The apparatus of claim 15, wherein the first UL-DL subframe configuration of 1 has an uplink round trip time (RTT) for a HARQ process of 10 milliseconds, and wherein the first UL-DL subframe configuration of 2 has an uplink RTT different than 10 milliseconds.

20. The apparatus of claim 15, wherein the processor is further configured to:
   receive respective indications of the first and second UL-DL subframe configurations; and
   store, in the memory, the first and second UL-DL subframe configurations.

* * * * *